United States Patent
Tolmie et al.

(10) Patent No.: US 6,824,696 B1
(45) Date of Patent: Nov. 30, 2004

(54) OIL FROM WATER SEPARATOR

(75) Inventors: David Bleasdale Tolmie, East Ryde (AU); Phineas Balantyne Stone, Harbord (AU)

(73) Assignee: Unisearch Limited, Kensington (AU)

( * ) Notice: Subject to any disclaimer, the term of this patent is extended or adjusted under 35 U.S.C. 154(b) by 0 days.

(21) Appl. No.: 09/403,800

(22) PCT Filed: Apr. 24, 1998

(86) PCT No.: PCT/AU98/00298

§ 371 (c)(1),
(2), (4) Date: Feb. 22, 2000

(87) PCT Pub. No.: WO98/49101

PCT Pub. Date: Nov. 5, 1998

(30) Foreign Application Priority Data

| Apr. 24, 1997 | (AU) | ................................. PO6393 |
| Apr. 1, 1998 | (AU) | ................................. PP2742 |

(51) Int. Cl.[7] .................................................. C02F 1/40
(52) U.S. Cl. ..................... 210/801; 210/532.1; 210/538; 137/132; 137/140; 137/152
(58) Field of Search ................................ 210/800, 801, 210/104, 513, 532.1, 532.2, 538; 137/123, 130, 132, 134, 140, 152; 37/123, 130, 132, 134, 140, 152

(56) References Cited

U.S. PATENT DOCUMENTS 745,519 A * 12/1903 Pravicha et al.
2,284,737 A * 6/1942 Hirshstein

FOREIGN PATENT DOCUMENTS

| AU | A-28359/97 | 1/1998 |
| DE | 44 37 837 A1 | 10/1994 |
| EP | 0 354 349 B1 | 12/1992 |
| EP | 0 457 951 B1 | 10/1994 |
| FR | 2 337 572 | 1/1976 |
| FR | 2559811 | 2/1984 |
| FR | 2567506 | 7/1984 |
| GB | 318087 | 8/1929 |
| SE | 458619 | 4/1989 |
| WO | WO 94/04464 | 3/1994 |

* cited by examiner

*Primary Examiner*—Robert James Popovics
(74) *Attorney, Agent, or Firm*—Knobbe, Martens, Olson & Bear, LLP (57) ABSTRACT

An oil from water separator has an oil disengagement chamber adapted to receive an oil and water mixture and retain it for a sufficient time in a relatively undisturbed state so that oil in the mixture floats to the top of the mixture. This results in a substantially oil free volume of water having a layer of oil derived from said oil and water mixture floating on the surface of the mixture. The oil disengagement chamber is partially separated from an effluent water chamber by an under flow baffle which ducts said substantially oil free volume of water to the effluent water chamber. The oil disengagement chamber has a low liquid level which is higher than the under flow baffle. The outflow of the substantially oil free volume of water from the effluent water chamber is limited to a rate of outflow which is a function of the head of the liquid in the effluent water chamber. The outflow is limited by a siphon which primes at a chamber high liquid level and loses prime at said chamber low liquid level, or by holes in a weir wall.

24 Claims, 8 Drawing Sheets

Fig. 1

Prior Art

Fig. 12

OIL FROM WATER SEPARATOR

FIELD OF THE INVENTION

The present application relates to oil from water separators and, more particularly, such separators suitable for use in inground or aboveground installations where it is desired to prevent oil in water concentrations above a predetermined limit from being distributed to the environment in an uncontrolled fashion.

BACKGROUND

Mechanical oil from water separator systems are known. Devices/systems are also known that provide settling in chambers separated by baffles—refer the arrangement of FIG. 1 which shows a Prior Art American Petroleum Institute (API) oil from water separator design. It consists of a rectangular tank with two or more vertical partitions or baffles to separate entry chamber, oil disengagement chamber and effluent water chamber, and which is designed to run full of water.

The API oil from water separator is sized to provide low turbulence conditions and sufficient residence time for oil globules with a minimum diameter of 0.015 cm (150 microns) to separate from the oil/water mixture flowing though the separator.

This prior art system can be characterised as a decant-type system where for every input of liquid there is an output of a similar amount at the same time, thereby affecting separation efficiency.

Attempts have been made in the prior art to control the level of the oil/water interface, for example see U.S. Pat. No. 5,147,534 (Rymal) and U.S. Pat. No. 4,031,007 (Sierra) and, more generally, see U.S. Pat. No. 4,960,513 (Young), U.S. Pat. No. 4,436,630 (Anderson) and U.S. Pat. No. 5,378,353 (Koch).

In all of these systems, whilst there has been a move away from a simple decant-type approach, there is usually added a specific oil from water separation process beyond mere gravitational separation. Koch requires a specific separate coalescer unit whilst U.S. Pat. No. 4,554,074 (Broughton) utilises separation plates.

In many applications it would be desirable to employ a separator system having the intrinsic simplicity of the API-type systems whilst achieving consistent predetermined levels of separation of oil from water.

It is an object of the present invention to provide an inherently simple oil from water separator system which provides consistent levels of separation of oil from water over a predetermined range of inflow conditions.

SUMMARY OF INVENTION

Accordingly, in one broad form of the invention there is provided an oil from water separator including an oil disengagement chamber adapted to receive an oil and water mixture and retain it for a sufficient time in a relatively undisturbed state whereby oil in the mixture floats to the top of the mixture resulting in a substantially oil free volume of water having a layer of oil derived from said oil and water mixture floating on the surface thereof; said oil disengagement chamber partially separated from an effluent water chamber by an under flow baffle which ducts said substantially oil free volume of water to said effluent water chamber; said oil from water separator characterised in that outflow of said substantially oil free volume of water from said effluent water chamber is limited by flow retarding means to a rate of outflow which is a function of the head of the liquid in said effluent water chamber.

In a further broad form of the invention there is provided an oil from water separator including an oil disengagement chamber adapted to receive an oil and water mixture and retain it for an extended time in a relatively undisturbed state whereby oil in the mixture floats to the top of the mixture resulting in a substantially oil free volume of water having a layer of oil derived from said oil and water mixture floating on the surface thereof; characterised in that outflow from said chamber is controlled in a predetermined way by flow retarding means.

In a further broad form of the invention there is provided an oil from water separation system including an oil disengagement chamber having a flush storage volume defined between a chamber high liquid level and a chamber low liquid level; a liquid volume equivalent to said flush storage volume caused to exit from said chamber on attainment of said chamber high liquid level.

Preferably said flush storage volume is caused to exit by means of a siphon mechanism.

In a further broad form of the invention there is provided an oil from water separator including an oil disengagement chamber adapted to receive an oil/water mixture and retain it for a sufficient time in a relatively undisturbed state whereby oil in the mixture floats to the top of the mixture resulting in a substantially oil free volume of water having a layer of oil derived from said oil and water mixture floating on the surface thereof; characterised in that outflow from said chamber is prevented until said mixture reaches a predetermined chamber high liquid level whereupon said volume of water is caused to exit said chamber.

In a further broad form of the invention there is provided an oil from water separator including an oil disengagement chamber adapted to receive an oil/water mixture and retain it for a sufficient time in a relatively undisturbed state whereby oil in the mixture floats to the top of the mixture resulting in a substantially oil free volume of water having a layer of oil derived from said oil and water mixture floating on the surface thereof; characterised in that outflow from said chamber is limited by flow retarding means to a predetermined function of the level of said oil and water mixture in said chamber.

Preferably said flow retarding means is operable only between a chamber low liquid level and a chamber high liquid level.

In one particular preferred form said flow retarding means comprises at least one siphon which primes at said chamber high liquid level and loses prime at said chamber low liquid level.

In an alternative preferred form said flow retarding means comprises at least one bleed aperture or weep hole.

Preferably said at least one bleed aperture or weep hole is located at the level of said chamber low liquid level.

More preferably said at least one bleed aperture or weep hole is sized with reference to expected inflow of said oil and water mixture into said oil disengagement chamber such that, during operation, the level of said oil and water mixture will rise from said chamber low liquid level up to a higher liquid level and then return to said chamber low liquid level, thereby defining for each situation an oil and water mixture active lag capacity or accumulation capacity between said chamber low liquid level and said higher liquid level.

More preferably said active lag capacity or accumulation capacity has a characteristic which is a function of (a) inflow rate
(b) desired residence time of said oil and water mixture in said oil disengagement chamber.

BRIEF DESCRIPTIONS OF THE DRAWINGS

Embodiments of the invention will now be described with reference to the accompanying drawings wherein:

FIG. 4B illustrates in cross section the first embodiment system of FIG. 2 to which FIG. 4A is applicable.

DETAILED DESCRIPTION OF PREFERRED EMBODIMENTS

Figure 1:
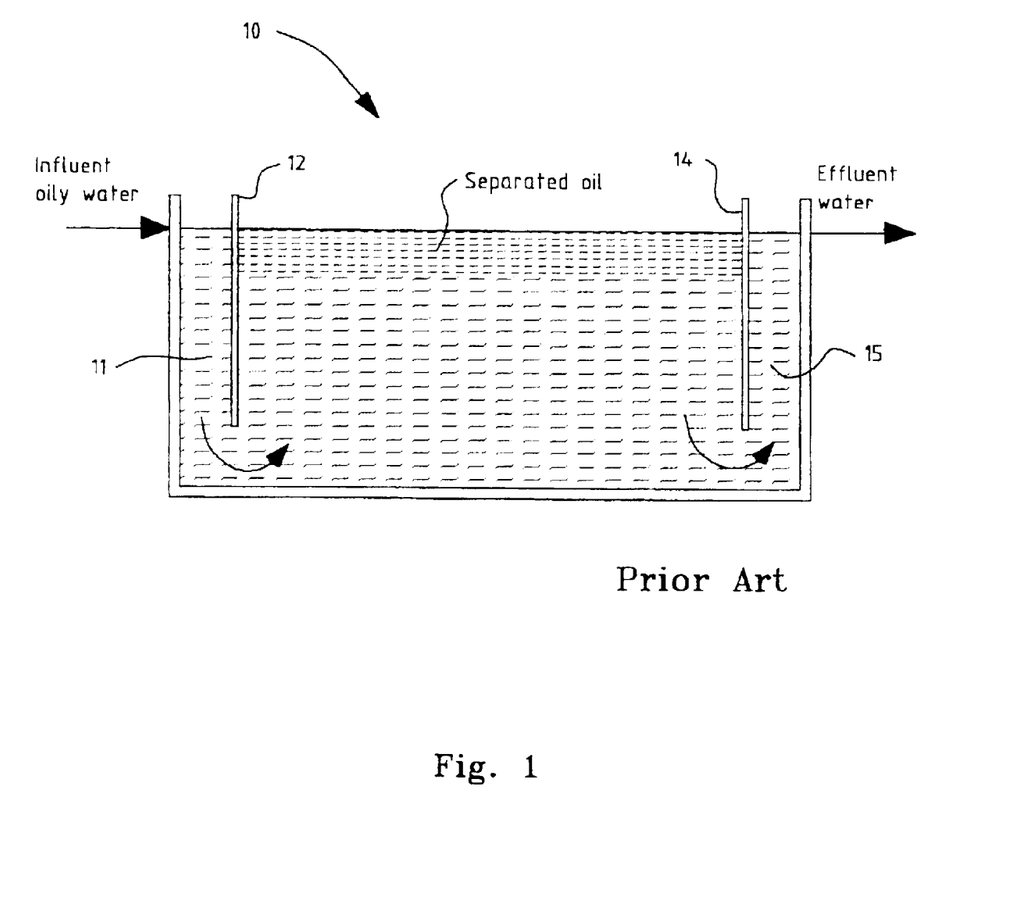
FIG. 1 illustrates a Prior Art (API) separator.

The Prior Art separator 10 of FIG. 1 comprises an entry chamber 11 separated by a baffle 12 from an oil disengagement chamber 13 which, in turn, is separated from an effluent water chamber (15) by a baffle (14).

Various embodiments of the invention as to be described below are characterised in their most broad form by the addition of a flow retarding device to an outlet portion of a separator. The separator can be in the box form of the prior art API separator of FIG. 1 or can take an alternative form (for example refer the cylinder form of example 3 of FIG. 11 to be described later in this specification).

The flow retarding device acts to ensure that for the majority of operating conditions likely to be encountered, water in the storage volume will have a sufficient residence time and flow in a sufficiently undisturbed manner to ensure oil from water separation substantially to a predetermined value.

In the embodiments described below the flow retarding device operates continuously to retard flow. Embodiments differ in how the outflow is permitted.

In all cases, accumulation occurs in the oil disengagement chamber as a result of control of outflow.

Furthermore, it imposes an outflow rate from the separator which is a function of the liquid head over the outflow level in the separator.

First Embodiment

Figure 2:
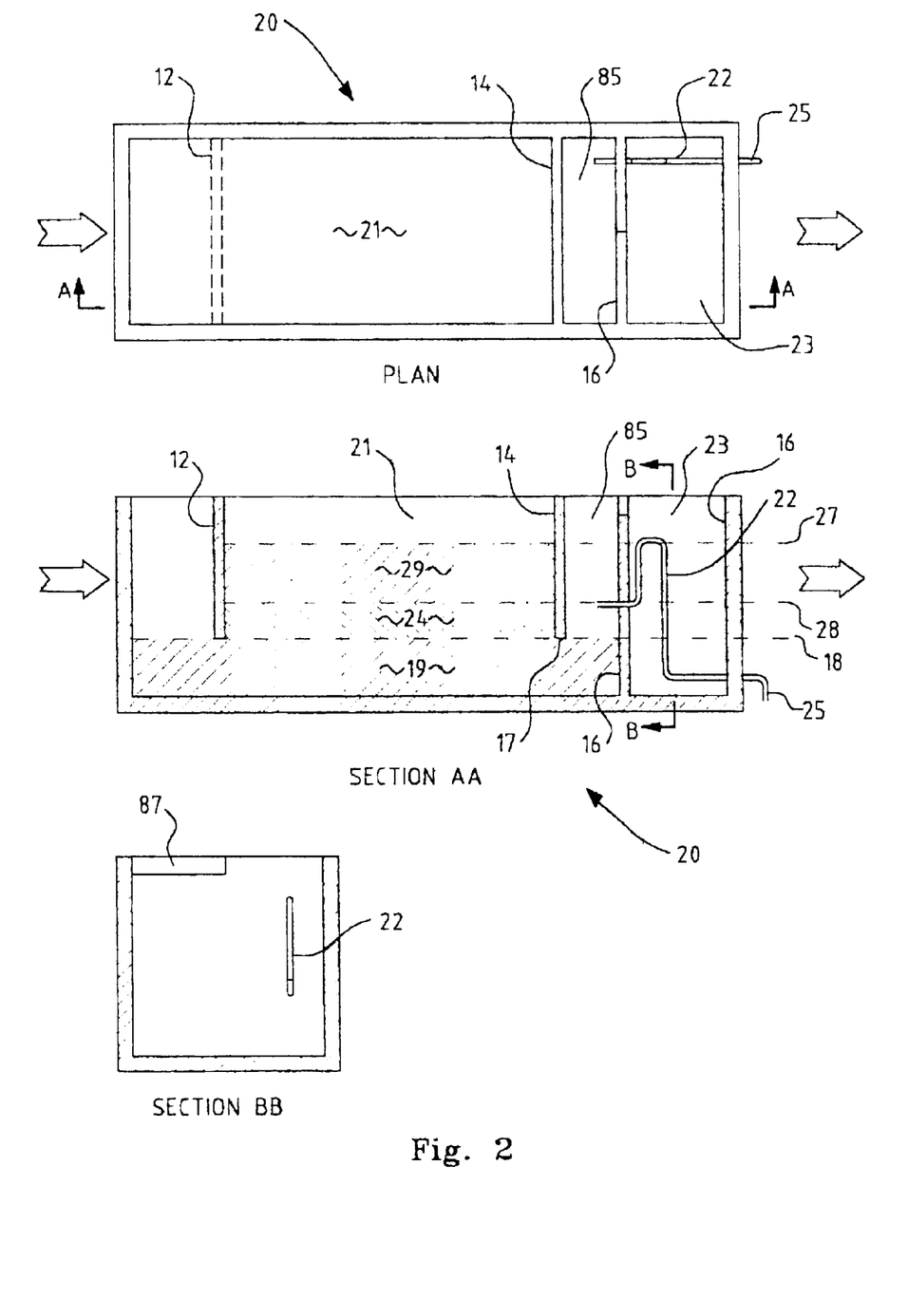
FIG. 2 illustrates a separator system according to a first embodiment of the system.

With reference to FIG. 2 an oil from water separator system 20 according to a first embodiment of the invention is illustrated.

Figure 3:
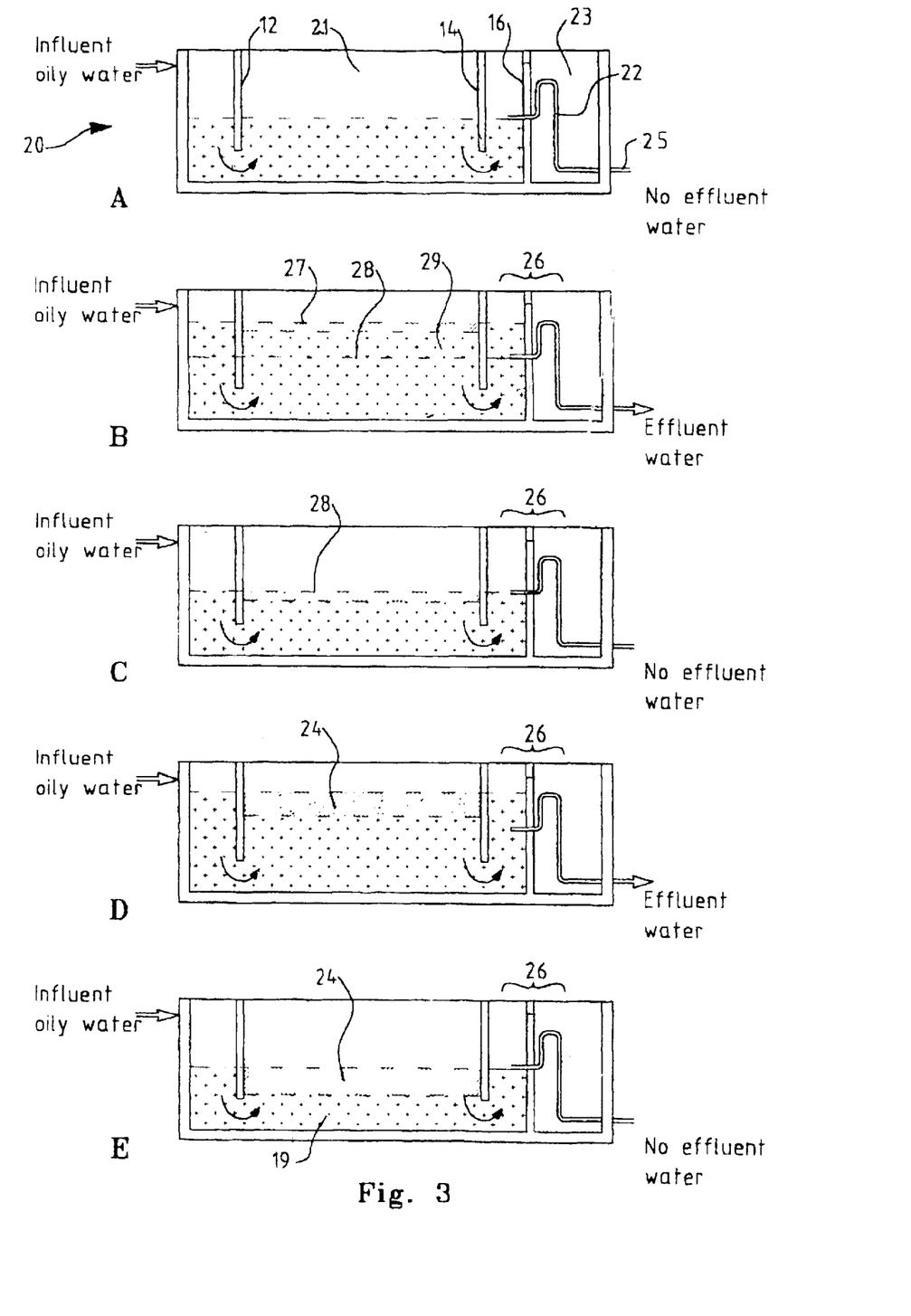
FIG. 3 illustrates the sequence of filling and emptying of the separator system of FIG. 2.

FIG. 3 shows a series of operating conditions A–E for the separator of FIG. 2.

The system 20 directs an influent of oily water through or under a baffle 12 to an oil disengagement chamber 21 the water from which passes beneath a skimmer wall or second baffle 14 to a siphon pipe 22 in an end wall 16. This siphon pipe discharges effluent water into exit pipe 25 through draw off chamber 23.

The siphon pipe 22, in operation, causes the level of liquid in oil disengagement chamber 21 to move between high level 27 and low level 28.

The volume of liquid defined between these two levels forms an accumulation capacity which is designated the flush storage volume or oil and water accumulation volume 29.

In use water laden with oil enters oil disengagement chamber 21 as in FIG. 3 with the level in the chamber 21 rising until the maximum accumulation volume 29 is achieved at which time siphon pipe 22 operates to cause the flush storage volume or accumulation volume 29 to exit via exit pipe 25 until the siphon breaks at low level 28. Low level 28 is selected to be, for design conditions, such that accumulated, separated oil cannot pass under the baffle 14 and escape from the separator oil disengagement chamber.

As more oil laden water enters oil disengagement chamber 21 the process repeats itself in accordance with FIG. 3 C, D, E.

In this manner a relatively large volume of oil/water mixture is retained for a relatively long period of time to allow oil separation to occur prior to siphoned exit.

Restated in other terms: A feature of this embodiment is the incorporation of one or more automatic siphons which release water only periodically from an oil disengagement chamber and which chamber creates a potential storage for a selected volume of first flush oil/water mixture or a major oil spillage of a volume equal to the flush storage volume or accumulation volume 29.

This volume 29 is sized to contain a major oil spillage or to be filled progressively with oil/water mixture from successive rainfall events. Until this volume 29 is accumulated, oil globules can coalesce and separate from the water over a period greater than the residence time available in the standard flow through decant separator of FIG. 1 for a given separator tank volume. The oil disengagement chamber 21 is quiescent with virtually zero turbulence except at the end of each cycle when the siphon is operating.

When the water surface reaches a selected chamber high liquid level 27 a siphon which discharges into draw off chamber 23 is primed whereby substantially oil-free water is released until the water surface falls to a selected chamber low liquid level 28 at which the siphon breaks. This releases a volume of effluent water equal to the accumulation volume 29 leaving capacity for the next cycle of oil/water inflows.

One can more specifically differentiate the volumes of liquid in the separator and, more specifically in the oil disengagement chamber as follows:

A. The flush storage volume or oil and water accumulation volume 29 as previously defined comprising that volume of liquid which can be accumulated in the disengagement chamber 21 between low level 28 and high level 27.

B. A separated oil volume 24 defined as the volume of liquid which can be stored in the chamber 21 between low level 28 and the lower edge 17 of baffle 14 defined at under pass level 18 in FIG. 2.

C. A quiescent volume 19 defined between under pass level 18 and the bottom of the disengagement chamber 21.

As will be appreciated the quiescent volume 19 will, in use, always contain a liquid. In a correctly sized and designed separator this liquid will be substantially effluent water.

As will be further appreciated periodic flushing of the separator by operation of the flow retarding device 26 will result in a volume of liquid equal to the oil and water accumulation volume 29 being moved from the oil disengagement chamber 21 through the effluent water chamber 85 and, via the flow retarding device 26 to the draw off chamber 23 and exit pipe 25. The liquid actually moved will include liquid found in all of the defined volumes 19, 24, 29, but not all of it in any one instance.

It is the oil and water accumulation volume 29 with its dynamic nature in that separation can take place within this volume whilst the liquid actually contained within the volume changes in quantity over time which provides the substantive separation characteristic and permits effective residence times of the order of hours (thereby achieving effective oil/water separation) for a treatment capacity in a given separator size greater than can be achieved with an equivalent sized API-type separator.

It will be further observed that when outflow does occur the rate of outflow is a function of the head of the liquid in the effluent water chamber 85.

Figure 4A:
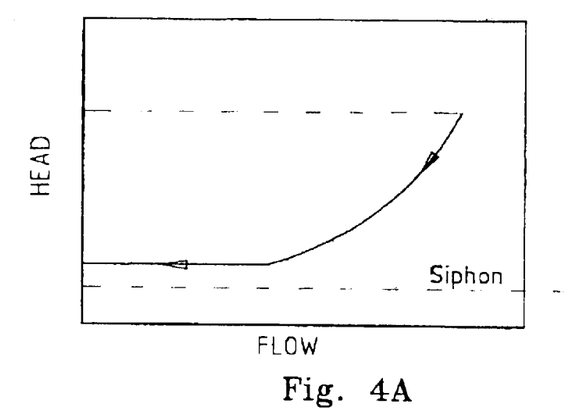
FIG. 4A is a graph of head versus flow for the separator system of FIG. 2.

FIG. 4A illustrates a head versus flow characteristic for the siphon arrangement of the first embodiment of FIG. 2.

Figure 4B:
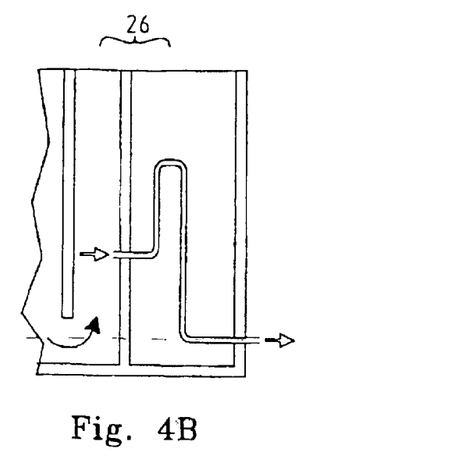

FIG. 4B is a side section view of the siphon-based retarding device 26 of FIG. 2.

Second Embodiment

Figure 5A:
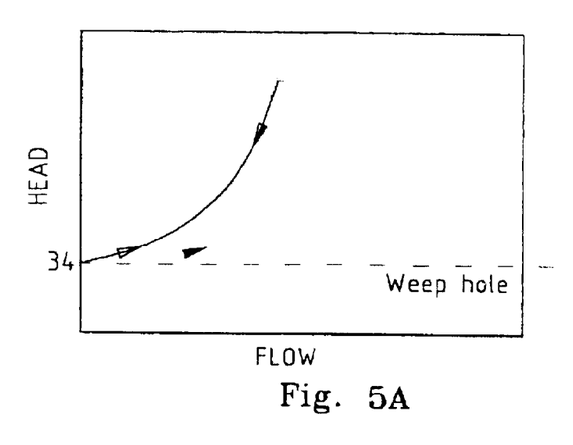
FIG. 5A is a graph of head versus flow for the system, of FIG. 5B.
Figure 5B:
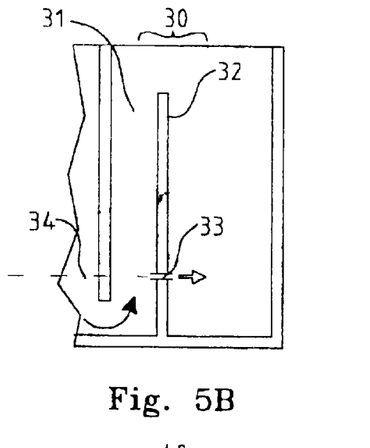
FIG. 5B illustrates in cross section a separator system according to a second embodiment of the invention.

FIG. 5A illustrates a second embodiment of the invention (in cross section) comprising a flow retarding device 30 in the end wall of a storage volume 31. In this instance the flow retarding device 30 comprises a retention wall 32 having a bleed aperture 33 (also termed a weep hole) therewithin which will permit the gradual release of liquid in storage volume 31 above a predetermined low level 34. The head versus flow characteristics for this arrangement are shown in FIG. 5B.

Third Embodiment

Figure 6A:
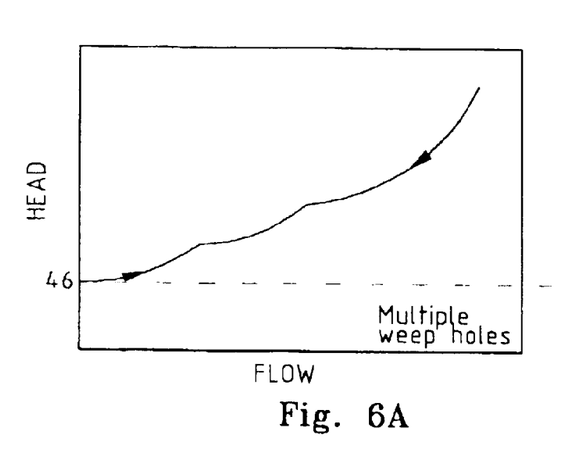
FIG. 6A is a graph of head versus flow for the system of FIG. 6B.

An alternative arrangement of the system of the invention according to a third embodiment is illustrated in cross section in FIG. 6A and comprises, in this instance, a retention wall 42 in an end wall of storage volume 41 having within it a first bleed aperture 43, a second bleed aperture 44 and a third bleed aperture 45 located at respective predetermined levels 46, 47, 48.

FIG. 6A shows a graph of head versus flow for this multiple weep hole embodiment of the flow retarding device 40.

Broadly it will be observed that the first embodiment of FIG. 2 utilises a siphon to achieve controlled flow retardation whilst the second and third embodiments utilise weep holes.

Whereas water will not start to flow through a siphon until a priming level is reached and will continue to flow until the water surface reaches some lower level, water will flow through a hole whenever the hole is submerged on and only on the upstream side.

The objective of controlling the release of water from an oil from water separator is to provide residence time in the separator during which the desired separation of oil droplets from the water can occur.

The siphon achieves this residence time by storing incoming water until the provided capacity is full, when the relatively oil-free water is released and the cycle starts again.

In some applications of a disengagement chamber for oil from water separation, the load may be regular as in daily washdowns and in these applications a slow drawdown overnight may be more desirable than the siphon characteristic.

Such an alternative characteristic can be achieved by replacing the siphon with weep holes, varying their number, sizes and locations to achieve any desired outflow/level relationship. This allows the water surface in the separator to return slowly to the bottom operating level without first reaching some top operating level but after a sufficient time for oil from water separation.

The relationship between separator water level and outflow for a siphon and one or more weep holes is illustrated in FIGS. 4A, 5A and 6A as earlier described.

Relative Inflow—Outflow Behaviour

Figure 7:
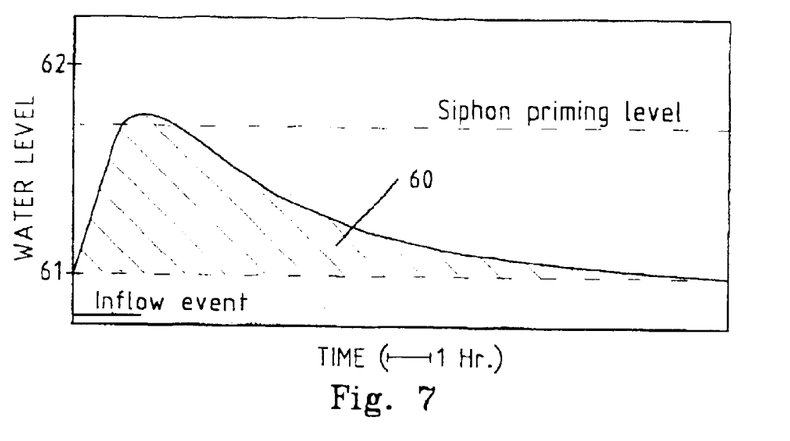
FIG. 7 is a graph of the behaviour of water level in the system of FIG. 2 in the form of a graph of water level versus time.
Figure 8:
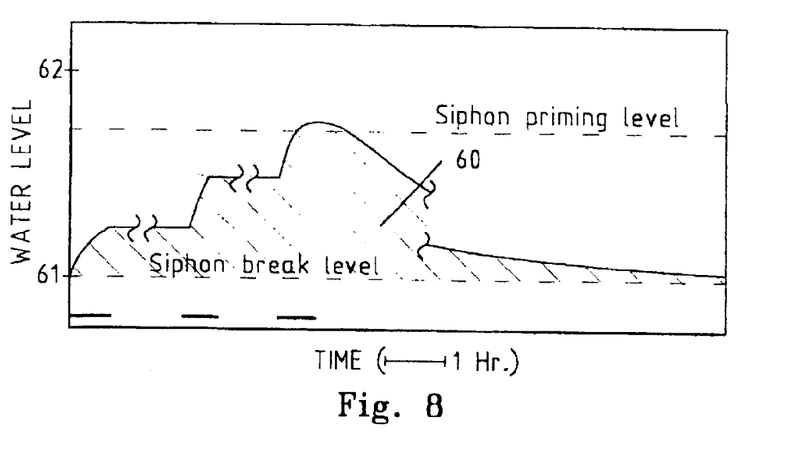
FIG. 8 illustrates the behaviour of the system of FIG. 2 under alternative operating conditions in the form of a graph of water level versus time.
Figure 9:
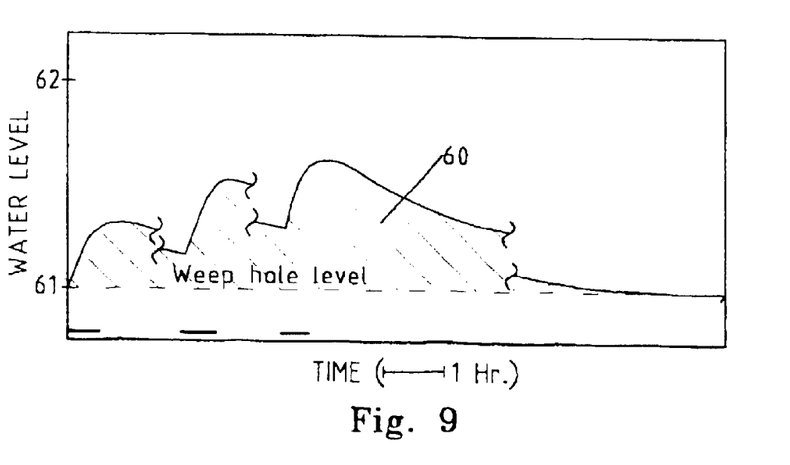
FIG. 9 illustrates the behaviour of the system of FIG. 5 in the form of a graph of water level versus time.

The movement in separator water level during an inflow event, however, will be broadly similar for the siphon and the weep holes, at least as far as achieved residence time is concerned. With some generality it can be asserted that:

An effective separator design will not require a cycle time (from rising above the bottom operating level to returning to it) of more than 12–24 hours For rainfall runoff typical of a 1 in 1 year event, the separator can fill to the top operating level in less than an hour The initial rise of the separator water level will be steep compared with the exponential fall after the outflow through the weep holes or the siphon (see FIGS. 7, 8 and 9)

The earlier release of water through a weep hole than will occur with a siphon not yet at its priming level will have negligible effect on the initial rise in water level During water level fall from the top operating level, the flow through both the weep hole and the siphon will decline exponentially as a function of head above the outlet If the inflow event is not large enough to prime the siphon, the water will remain in the separator until there is sufficient water; with a weep hole, the water outflow will continue to decline exponentially until the weep hole level is reached, still providing (by design) the desired residence time.

Fourth Embodiment

Figure 11:
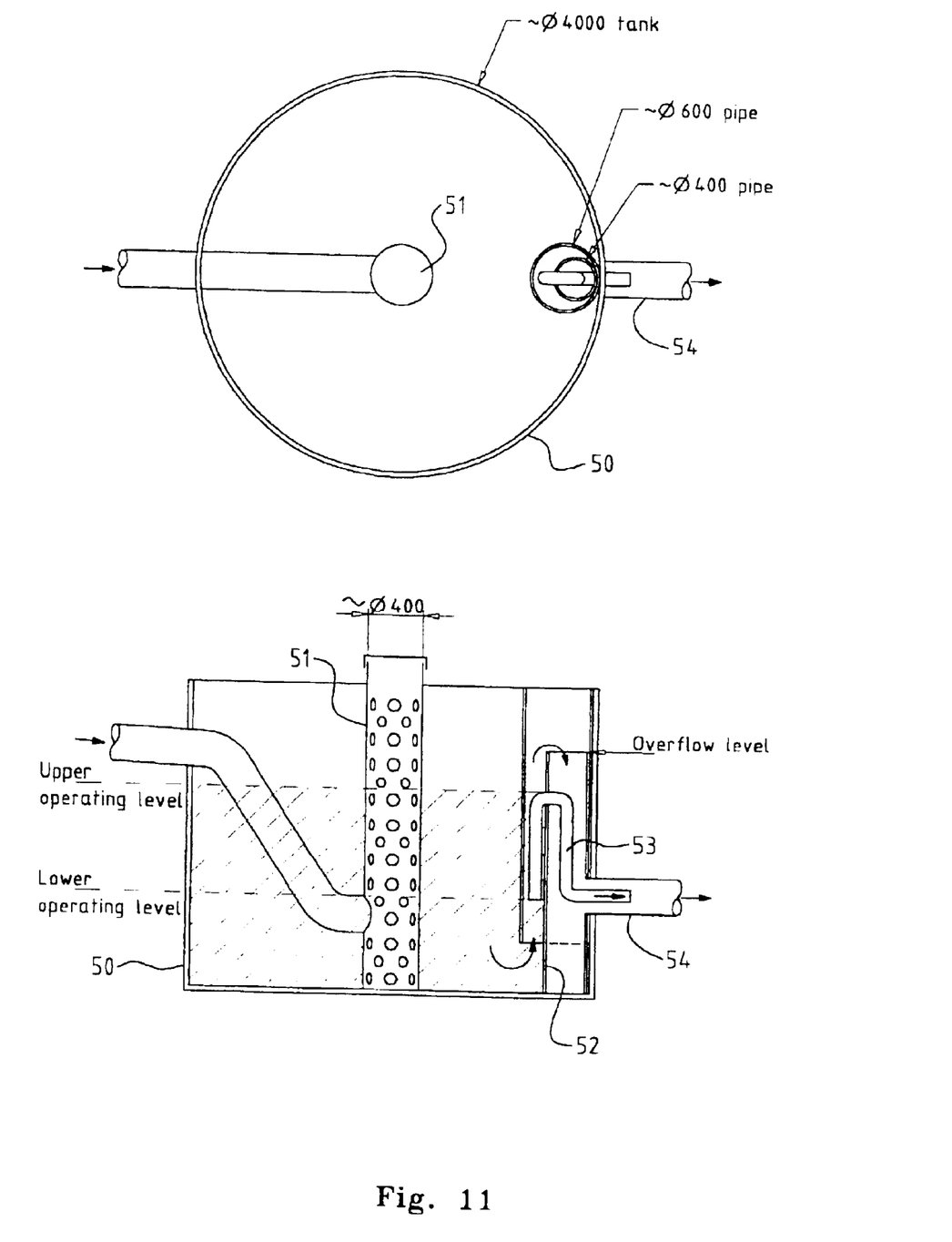

FIG. 11 illustrates an alternative storage volume arrangement which, as seen in plan view, takes the form of a doughnut-shaped tank 50 with inflow to a central distributor in the form of a stand pipe 51.

Outflow is from a circular retention wall 52. Controlled outflow is achieved either via a siphon pipe 53 to clarified water outlet 54 or via bleed apertures (not shown) in retention wall 52 or other flow retarding means.

For this embodiment dimensions of the siphon pipe and/or the bleed apertures can be as for either example 1 or example 2 below.

Active Lag Capacity

With reference to FIGS. 7, 8 and 9 the previously described embodiments can be seen to incorporate an active lag capacity or accumulation volume 60 which operates above a predefined liquid low level 61 and can extend as high as a predefined liquid high level 62 set by an overflow weir (such as weir 87 in FIG. 2).

The active lag capacity 60 comes into operation when inflow to the oil disengagement chamber is such that the liquid level rises above liquid low level 61.

Liquid low level 61 has associated with it, in these examples, either the lower end of a siphon or the lowest of at least one weep hole sized in the manner previously described and which, in combination with the end wall 16 or retention walls 32, 42, 52, forms a flow retarding means which is the dominant factor which controls the shape and characteristic of the active lag capacity 60 for a given inflow characteristic and storage volume characteristic.

The active lag capacity 60 by virtue of its coming into existence whilst there is mismatched relative inflow and outflow from the oil disengagement chamber has a dynamic or active characteristic which assists in efficient oil from water separation such that, for a predefined range of inflows, outflow will contain a proportion of oil in water substantially below a predefined limit.

Interconnected Separator Units

Figure 12:
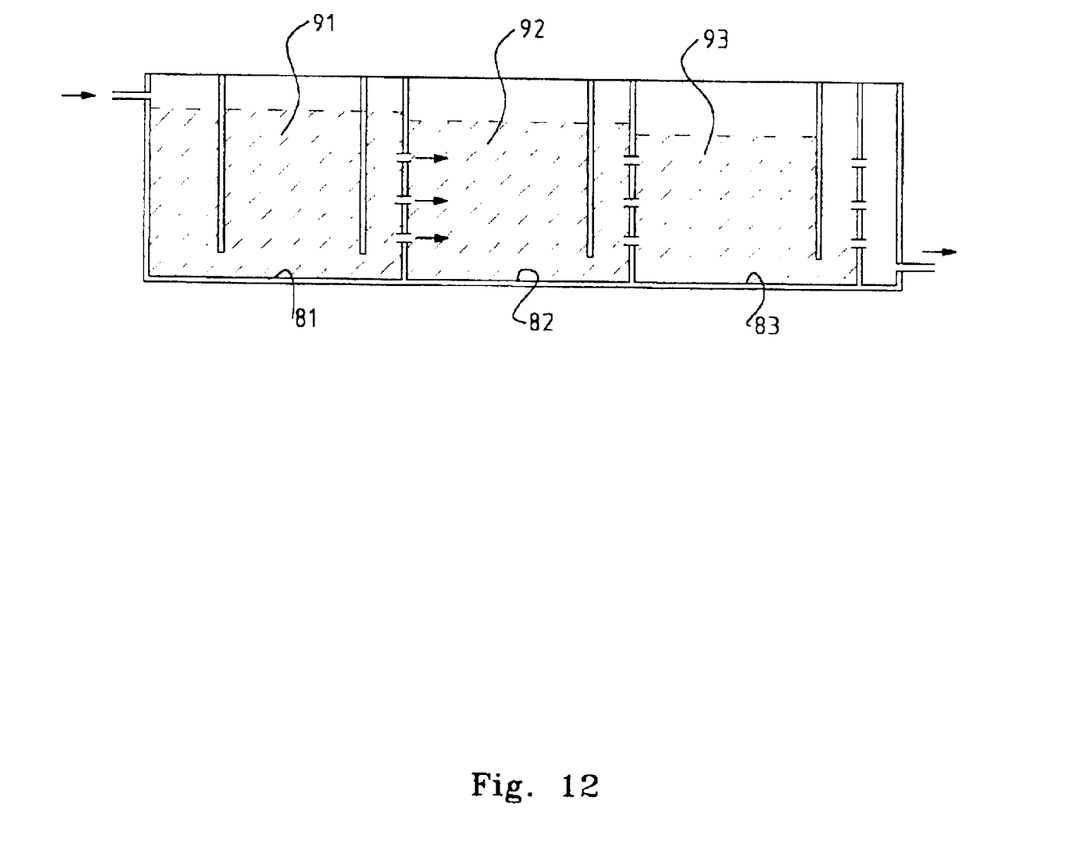
FIG. 12 is a side section view of multiple separator systems connected in a flow-through, series configuration.

With reference to FIG. 12 three separator units are connected in series whereby a first separator 81 having a lag capacity in the form of a first active lag volume 91 feeds its output, as illustrated, directly into second separator unit 82 having a second active lag volume 92, which separator unit in turn feeds its outflow into third separator unit 83 having a third active volume 93. In this instance the active lag capacity of the total system is determined by the composite characteristic of the active lag volumes 91, 92, 93.

This arrangement has particular advantage where site shape and/or size dictates that one large tank is inappropriate. The arrangement also provides additional flexibility in terms of total residence time.

It has one particular distinguishing characteristic as compared with the single tank implementations in that overflow from first separator 81 in the event of unforseen catastrophic inflow merely results in overflow of untreated or insufficiently treated oil/water mix into second volume 92 of second separator 82 rather than the immediate discharge of untreated or insufficiently treated oil/water mixture from the entire treatment system. This multiple tank arrangement, therefore, provides a "soft-fail" mode as well as providing additional design flexibility.

Examples of the various embodiments will now be given:

EXAMPLE 1

An API type rectangular tank with siphon installed in the exit wall. Typical dimensions are 7 m long, 1.5 m wide and siphon operating levels 1.6 m and 0.8 m above the floor. Volume=approx 17KL, about half of which is the range between siphon operating levels. The siphon is made of 18 mm OD hard drawn copper pipe and takes about 10 hours to draw the water level down.

EXAMPLE 2

Figure 6B:
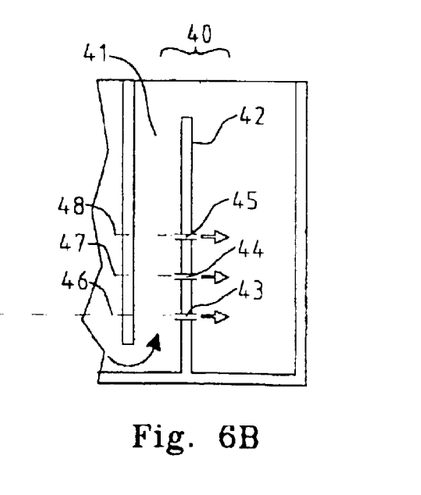
FIG. 6B illustrates, in cross section, a separator system according to a third embodiment of the invention involving multiple weep holes.
Figure 10:
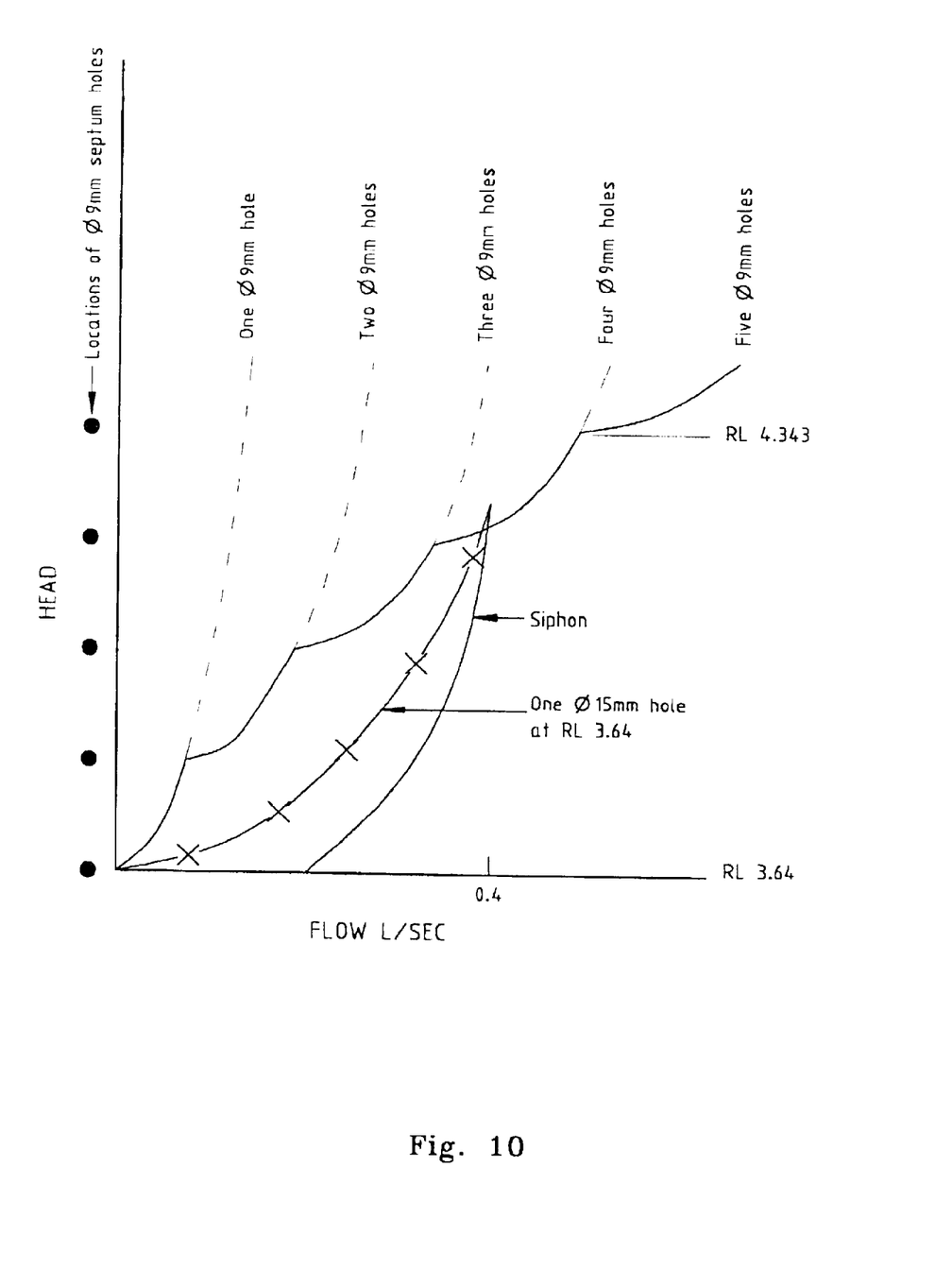
FIG. 10 illustrates particular flow characteristics of particular implementations of the invention (example 2) and FIG. 11 is a top view and side section view of a separator system according to a further embodiment of the invention.

FIG. 10 illustrates a particular example of head versus flow behaviour for the siphon embodiment of FIG. 2, the single weep hole embodiment of FIG. 5 and the multiple weep hole embodiment of FIG. 6 for various hole diameters as indicated.

The above describes only some embodiments of the present invention and modifications obvious to those skilled in the art can be made thereto without departing from the scope and spirit of the present invention.

It is expected that, in many embodiments, operation of the oil from water separator system would be unattended and/or automatic.

INDUSTRIAL APPLICABILITY

The oil from water separator device can be applied in situations such as transformer substations and other industrial sites where retention and controlled discharge of an oil and water mix to a specified level of separation is required.

What is claimed is:

1. An oil from water separator comprising:
   an oil disengagement chamber adapted to receive an oil and water mixture and retain it for a sufficient time in a relatively undisturbed state whereby oil in the mixture floats to the top of the mixture resulting in a substantially oil free volume of water having a layer of oil derived from said oil and water mixture floating on the surface thereof;
   an effluent water chamber partially separated from said oil disengagement chamber by an under flow baffle which ducts said substantially oil free volume of water to said effluent water chamber, the oil disengagement chamber having a chamber low liquid level which is higher than the underside of the under flow baffle, the outflow of said substantially oil free volume of water from said effluent water chamber being limited at a rate as a function of the head of the liquid in said effluent water chamber; and
   a flow retarding means comprising at least one siphon coupled to said effluent water chamber to limit the rate of outflow of said substantially oil free volume of water from said effluent water chamber wherein said flow retarding means primes at a chamber high liquid level and loses prime at said chamber low liquid level such that during operation, the level of said oil and water mixture will rise from said chamber low liquid level up to a higher liquid level and then return to said chamber low liquid level, thereby defining an oil and water mixture active lag capacity within an oil and water mixture accumulation volume in said oil disengagement chamber and wherein said flow retarding means operates to accumulate said oil and water mixture in said oil disengagement chamber in said oil and water mixture accumulation volume above said chamber low liquid level and wherein said accumulation volume is sized with reference to inflow rate and
   desired residence time of said oil and water mixture in said oil disengagement chamber such that, for a predefined range of inflows into said oil disengagement chamber, outflow from said effluent water chamber will contain a proportion of oil in water substantially below a predefined limit.

2. The separator of claim 1 operable whereby said desired residence time is such that said oil and water mixture is retained in said oil and water mixture accumulation volume in said oil disengagement chamber for an effective residence time comprising a period of time long relative to conventional liquid full separators thereby to allow oil separation to occur prior to periodic siphoned exit.

3. The separator of claim 2 wherein said effective residence time is of the order of hours.

4. The separator of claim 1 operable such that periodic flushing of said separator by operation of said flow retarding means will result in a volume of liquid equal to said oil and water accumulation volume being moved periodically from said oil disengagement chamber through said effluent water chamber so as to exit via said flow retarding means.

5. The separator of claim 1 whereby said flow-retarding means operates to provide an outflow characteristic of outflow from said oil and water mixture accumulation volume which has a different characteristic from an inflow characteristic of inflow into said oil and water mixture accumulation volume.

6. The separator of claim 5 wherein said outflow characteristic is a discontinuous function of the liquid level in said effluent water chamber.

7. The separator of claim 5 wherein there exists a mismatch whereby said inflow characteristic is mismatched relative to said outflow characteristic.

8. The separator of any one of claim 1 or claims 2 to 7 wherein separation can take place within said oil and water accumulation volume whilst liquid contained in said volume changes in quantity and level over time.

9. A method of converting a separator which has an oil disengagement chamber and an effluent water chamber partially separated from said oil disengagement chamber by an under flow baffle such that the separator normally operates liquid full, to a separator which operates in a manner whereby liquid level in said separator will vary with time and rate of inflow into said separator, said method comprising:
   installing a flow retarding device in the form of at least one siphon in or in association with a weir wall of the separator so that a rate of outflow of a substantially oil free volume of water from the effluent water chamber is controlled as a function of a head of liquid in the effluent water chamber, such that during operation, the oil disengagement chamber receives an oil and water mixture and retains it for a sufficient time in a relatively undisturbed state to allow oil in the mixture to float to the top of the mixture resulting in a substantially oil free volume of water with a layer of separated oil floating thereon wherein the substantially oil free volume of water flows to the effluent water chamber under the under flow baffle to define the head of liquid in the effluent water chamber, the oil disengagement chamber having a chamber low liquid level which is higher than the underside of the under flow baffle, and wherein the flow retarding device operates to accumulate the oil and water mixture in the oil disengagement chamber such that the level of the oil and water mixture rises from said chamber low liquid level up to a higher liquid level and then returns to said chamber low liquid level by the action of the flow retarding device thereby defining an oil and water mixture active lag capacity within an oil and water mixture accumulation volume in the oil disengagement chamber, wherein the flow retarding device primes at a chamber high liquid level and loses prime at the chamber low liquid level and wherein said accumulation volume is sized with reference to an inflow rate and desired residence time of said oil and water mixture in said oil disengagement chamber such that, for a predefined range of inflows into said oil disengagement chamber, outflow from said effluent water chamber will contain a proportion of oil in water substantially below a predefined limit.

10. The method of claim 9 wherein said separator after conversion according to said method is operable whereby said desired residence time is such that said oil and water mixture is retained in said oil and water mixture accumulation volume in said oil disengagement chamber for an effective residence time comprising a period of time long relative to conventional liquid full separators thereby to allow oil separation to occur prior to periodic siphoned exit.

11. The method of claim 10 wherein said effective residence time is of the order of hours.

12. The method of claim 9 wherein said separator is operable such that periodic flushing of said separator by operation of said flow retarding means will result in a volume of liquid equal to said oil and water accumulation volume being moved periodically from said oil disengagement chamber through said effluent water chamber so as to exit via said flow retarding means.

13. The method of claim 9 wherein said flow-retarding means operates to provide an outflow characteristic of outflow from said oil and water mixture accumulation volume which has a different characteristic from an inflow characteristic of inflow into said oil and water mixture accumulation volume.

14. The method of claim 13 wherein said outflow characteristic is a discontinuous function of the liquid level in said effluent water chamber.

15. The method of claim 13 wherein there exists a mismatch whereby said inflow characteristic is mismatched relative to said outflow characteristic.

16. The method of any one of claim 9 or claims 10 to 15 wherein separation can take place within said oil and water accumulation volume whilst liquid contained in said volume changes in quantity and level over time.

17. An oil from water separation system comprising:
   a plurality of oil from water separators wherein each oil from water separator comprises:
      an oil disengagement chamber adapted to receive an oil and water mixture and retain it for a sufficient time in a relatively undisturbed state whereby oil in the mixture floats to the top of the mixture resulting in a substantially oil free volume of water having a layer of oil derived from said oil and water mixture floating on the surface thereof;
      an effluent water chamber partially separated from said oil disengagement chamber by an under flow baffle which ducts said substantially oil free volume of water to said effluent water chamber, the oil disengagement chamber having a chamber low liquid level which is higher than the under flow baffle, the outflow of said substantially oil free volume of water from said effluent water chamber being limited at a rate as a function of the head of the liquid in said effluent water chamber;
      a flow retarding means comprising at least one siphon coupled to said effluent water chamber to limit the rate of outflow of said substantially oil free volume of water from said effluent water chamber wherein said flow retarding means primes at a chamber high liquid level and loses prime at said chamber low liquid level such that during operation, the level of said oil and water mixture will rise from said chamber low liquid level up to a higher liquid level and then return to said chamber low liquid level, thereby defining an oil and water mixture active lag capacity within an accumulation volume in said oil disengagement chamber and wherein said flow retarding means operates to accumulate said oil and water mixture in said oil disengagement chamber in said accumulation volume above said chamber low liquid level and wherein said accumulation volume is sized with reference to inflow rate and desired residence time of said oil and water mixture in said oil disengagement chamber such that, for a predefined range of inflows into said oil disengagement chamber, outflow from said effluent water chamber will contain a proportion of oil in water substantially below a predefined limit; and wherein said plurality of separators are connected in series whereby outflow from each preceding separator passes to an inlet of the next succeeding separator.

18. The separation system of claim 17 wherein each said separator is operable whereby said desired residence time is such that said oil and water mixture is retained in said oil and water mixture accumulation volume in said oil disengagement chamber for an effective residence time comprising a period of time long relative to conventional liquid full separators thereby to allow oil separation to occur prior to periodic siphoned exit.

19. The separation system of claim 18 wherein said effective residence time is of the order of hours.

20. The separation system of claim 17 wherein each said separator is operable such that periodic flushing of said separator by operation of said flow retarding means will result in a volume of liquid equal to said oil and water accumulation volume being moved periodically from said oil disengagement chamber through said effluent water chamber so as to exit via said flow retarding means.

21. The separation system of claim 17 wherein said flow-retarding means operates to provide an outflow characteristic of outflow from said oil and water mixture accumulation volume which has a different characteristic from an inflow characteristic of inflow into said oil and water mixture accumulation volume.

22. The separation system of claim 21 wherein said outflow characteristic is a discontinuous function of the liquid level in said effluent water chamber.

23. The separation system of claim 21 wherein there exists a mismatch whereby said inflow characteristic is mismatched relative to said outflow characteristic.

24. The separation system of any one of claim 17 or claims 18 to 23 wherein separation can take place within said oil and water accumulation volume whilst liquid contained in said volume changes in quantity and level over time.

* * * * *